July 28, 1959 J. A. GORDON 2,896,727
APPARATUS FOR HARNESSING THE POWER OF THE WIND
Filed Sept. 30, 1957 3 Sheets-Sheet 3
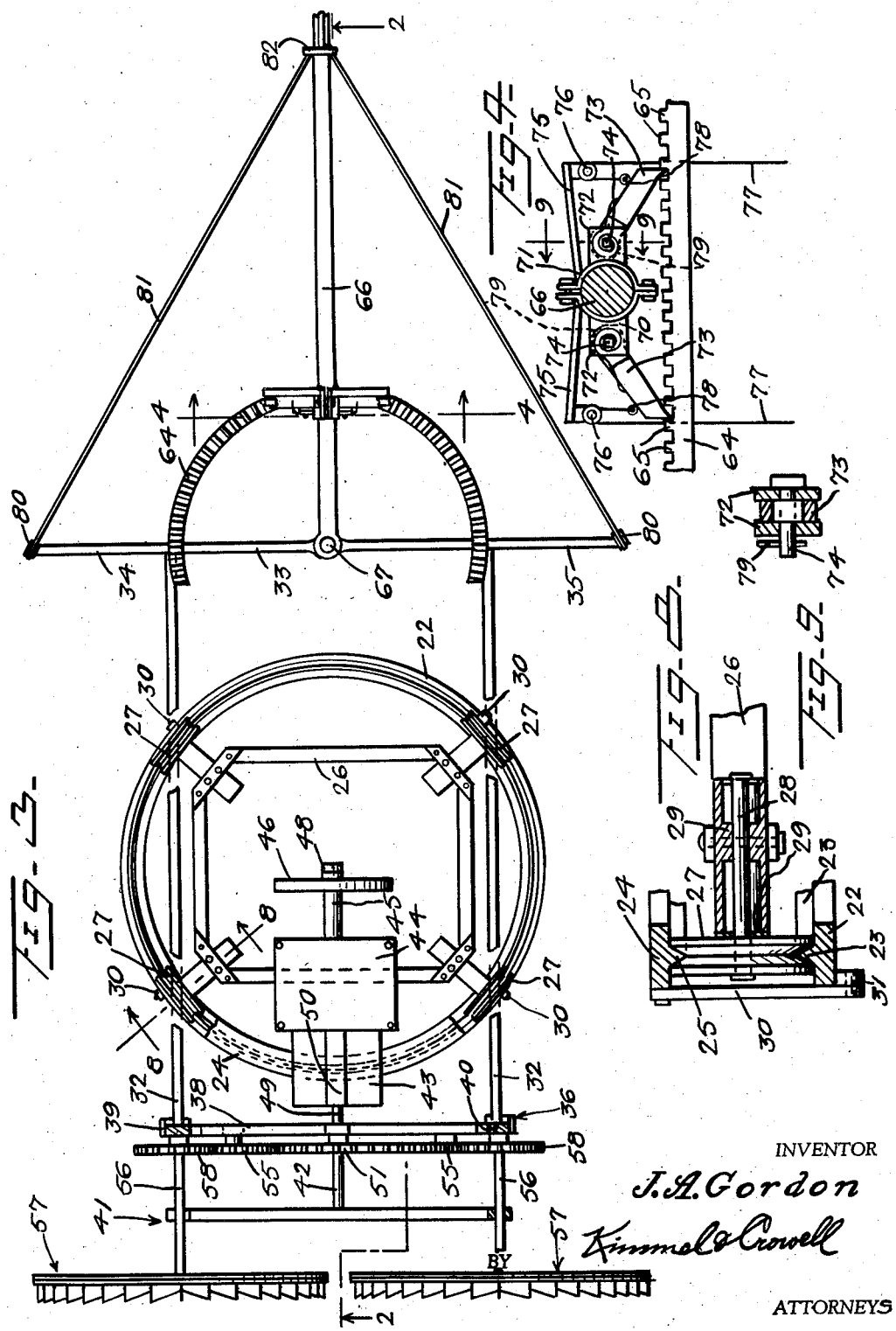
INVENTOR
J.A.Gordon
BY Kimmel & Crowell
ATTORNEYS United States Patent Office 2,896,727
Patented July 28, 1959

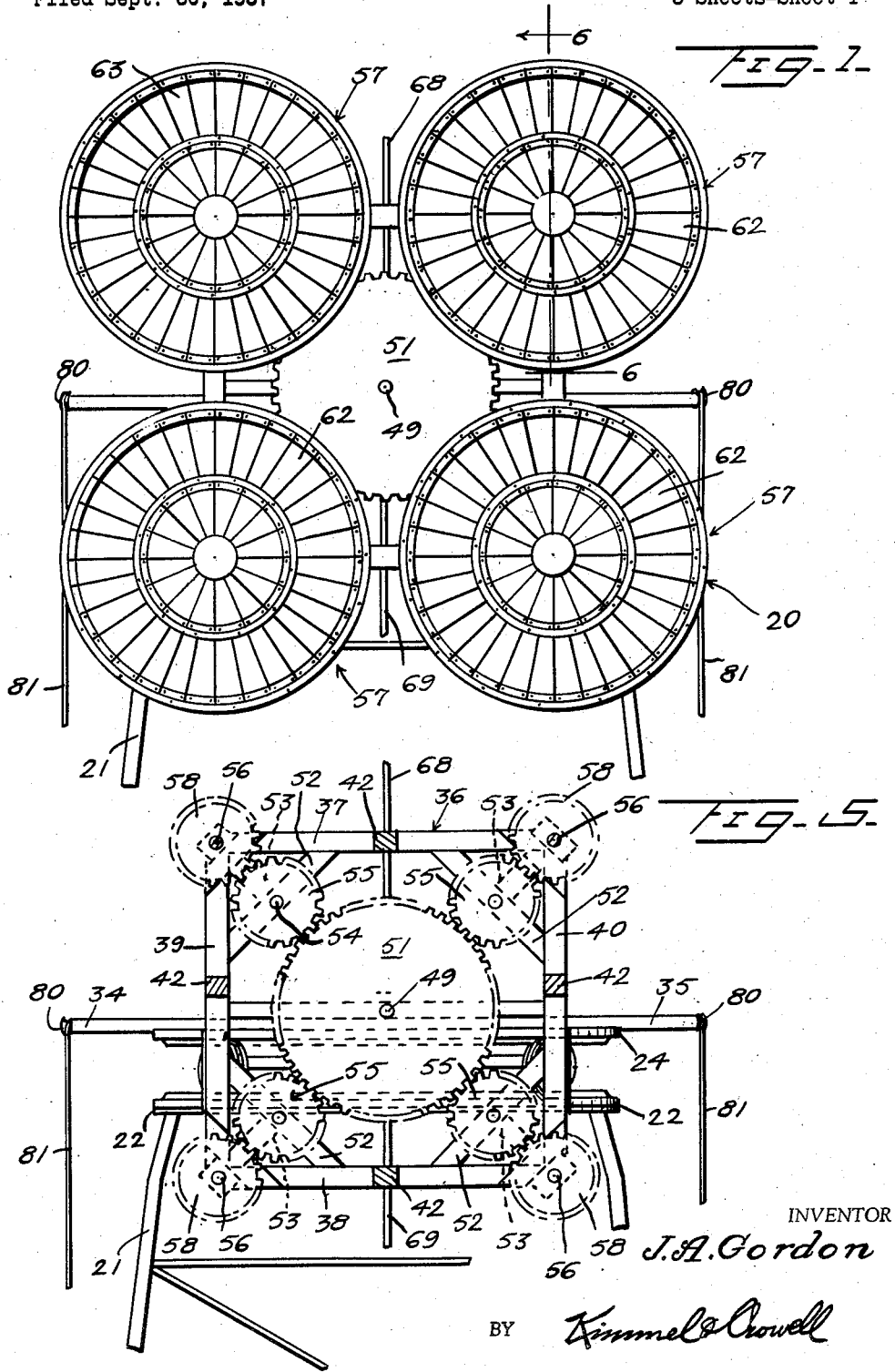

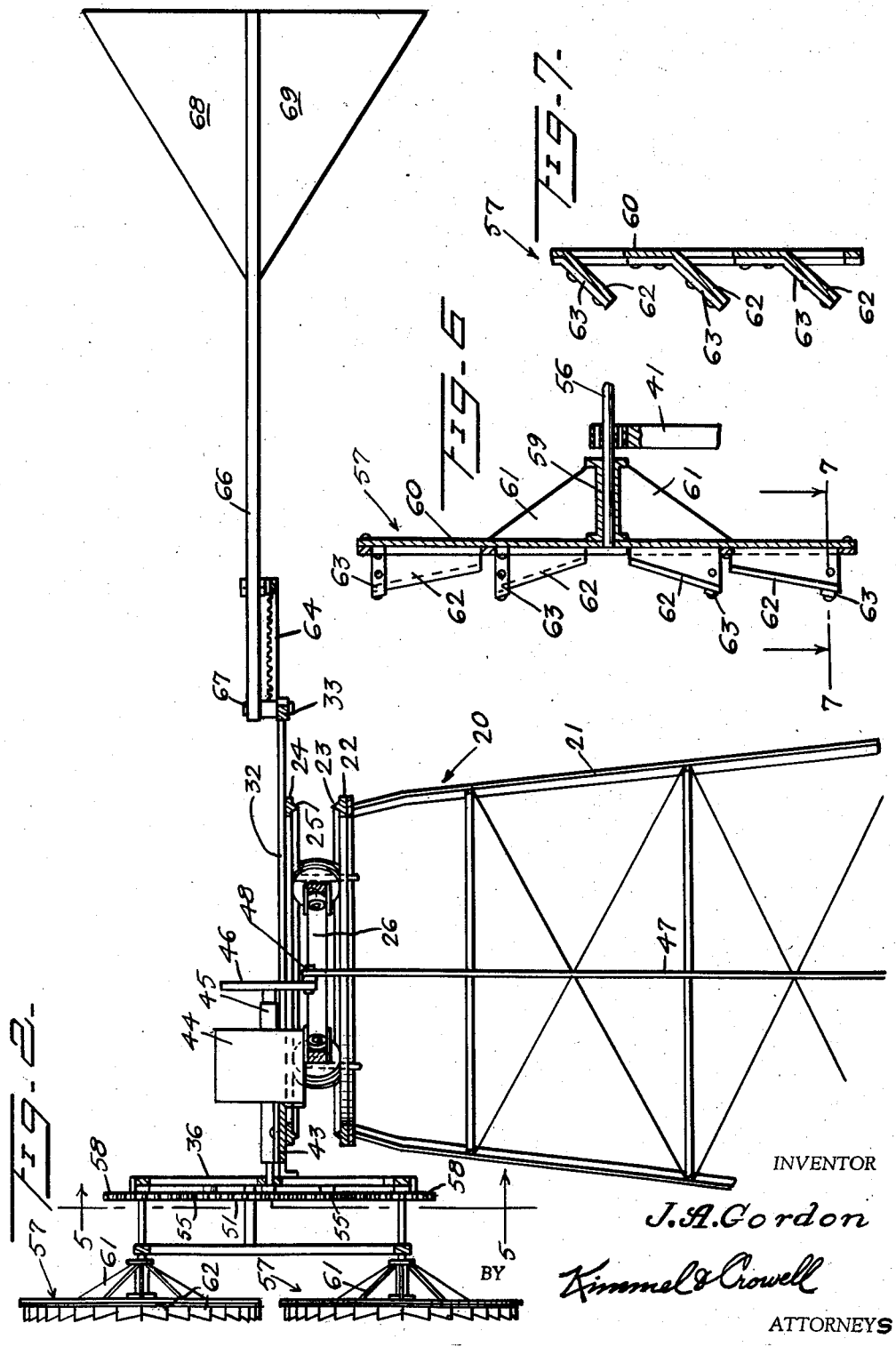

2,896,727
APPARATUS FOR HARNESSING THE POWER OF THE WIND

James A. Gordon, Douglas, Ariz.

Application September 30, 1957, Serial No. 687,172

3 Claims. (Cl. 170—38)

The present invention relates to windmills and particularly to windmills having multiple driven wheels coupled to a single work arm.

The primary object of the invention is to provide a windmill having a plurality of wind wheels geared together through a single transmission to cooperatively drive a single work apparatus.

Another object of the invention is to provide a single revolving frame structure for supporting a plurality of wind wheels.

A further object of the invention is to provide a tail vane structure for multiple wind wheels which will maintain the wind wheel in axially aligned relation with respect to the wind during operation of the wind wheels and with the axis of the wind wheels perpendicular to the wind when out of operation.

A still further object of the invention is to provide a windmill of the class described above which is inexpensive to manufacture, simple to use and which produces power from the wind quite efficiently.

Other objects and advantages will become apparent in the following specification when considered in the light of the attached drawings, in which:

Figure 1 is a fragmentary front elevation of the invention.

Figure 2 is a fragmentary vertical cross-section taken along the line 2—2 of Figure 3, looking in the direction of the arrows.

Figure 3 is a fragmentary top plan view of the invention shown partially broken away for convenience of illustration.

Figure 4 is an enlarged fragmentary transverse cross-section taken along the line 4—4 of Figure 3, looking in the direction of the arrows.

Figure 5 is a fragmentary vertical cross-section taken along the line 5—5 of Figure 2, looking in the direction of the arrows.

Figure 6 is an enlarged fragmentary vertical cross-section taken along the line 6—6 of Figure 1, looking in the direction of the arrows.

Figure 7 is an enlarged fragmentary transverse cross-section taken along the line 7—7 of Figure 6, looking in the direction of the arrows.

Figure 8 is an enlarged fragmentary vertical cross-section taken along the line 8—8 of Figure 3, looking in the direction of the arrows.

Figure 9 is an enlarged fragmentary vertical cross-section taken along the line 9—9 of Figure 4, looking in the direction of the arrows.

Referring now to the drawings in detail wherein like reference characters indicate like parts throughout the several figures, the reference numeral 20 indicates generally a windmill constructed in accordance with the invention.

The windmill 20 includes a conventional braced tower 21 having a circular track 22 secured in horizontal relation to its upper end and having an upwardly extending inverted V-shaped flange 23 extending thereabove.

A circular track 24 is positioned and spaced in parallel relation above the track 22 and is provided with a V-shaped flange 25 on the lower surface thereof. A generally rectangular frame 26 is positioned between the circular rails 22 and 24. A V-grooved trunnion wheel 27 extends diagonally from each corner of the frame 26 and is carried on a shaft 28 journaled in bearings 29 supported in the corners of the frame 26. The trunnion wheel 27 rests on the track 22 engaging over the V-shaped flange 23 and support the track 24 with the V-shaped flange 25 engaging in the V-grooved trunnion wheel 27. A plurality of brackets 30 are detachably secured to the track 24 in depending relation and have rollers 31 journaled on their lower ends engaging under the track 22 to maintain the track 24 in engagement with the trunnion wheels 27.

A pair of spaced parallel framed members 32 rest on the circular track 24 and are secured thereto by suitable means such as welding or the like. The horizontal frame members 32 are connected at their rear ends by a transversely extending cross-frame 33 welded thereto and having the opposite ends 34, 35 thereof extending laterally beyond the frame members 32. A rectangular frame 36 is secured to the forward ends of the horizontal frame members 32 in perpendicularly extending relation. The rectangular frame 36 has spaced parallel upper and lower frame members 37, 38 connected by spaced parallel side frame members 39, 40. A second rectangular frame indicated generally at 41 is positioned in spaced parallel relation forwardly of the frame 36 and supported thereon by relatively short cross-members 42.

A base plate 43 is secured to the track 42 and has secured thereto a transmission gear box 44. A drive shaft 45 extends outwardly from the transmission gear box 44 and has a bow wheel 46 mounted thereon for rotation therewith. A vertically extending connecting rod 47 is pivotally connected at 48 to the bow wheel 46 eccentrically thereon. A driven shaft 49 extends from the gear box 44 oppositely of the shaft 45 and is journaled in a bearing block 50 carried on the plate 43. A relatively large gear 51 is keyed to the outer end of the shaft 49 for rotation therewith. Each corner of the rectangular frame 36 is provided with a diagonally extending cross-member 52 supported by a diagonally extending brace member 53 arranged perpendicularly to the diagonal member 52 and extending to the respective corner of the frame 36. A shaft 54 is journaled in each of the diagonal members 52 centrally thereof and carries an idler gear 55 on its outer end. Each of the gears 55 are meshed with the gears 51 as can be seen in the Figure 5. A shaft 56 is journaled in each of the outer corners of the frame 36 and is further journaled in each of the frames 41 supporting the shafts 56 therein for rotation.

A wind wheel 57 is keyed to the forward end of each of the shafts 56 and a gear 58 is keyed to the shafts 56 rearwardly of the wind wheels 57 intermediate the frames 36 and 41. Each of the gears 56 mesh with one of the idler gears 55 so as to rotate therewith.

Referring now specifically to Figures 6 and 7, the wind wheel 57 includes a hub 59 fixed to the shaft 56 and carrying a disc 60 on the outer end thereof. Brace webs 61 extend radially outwardly from the hub 59 and are secured to the disc 60 to maintain the disc 60 perpendicular to the shaft 56. The disc 60 has a plurality of blades 62 bent forwardly therefrom and supported by braces 63. The blades 62 extend at an angle to the disc 60 and cause the disc 60 to rotate as wind passes thereover. The wind wheels 57 each drive the gear 51 through the gears 55 and 58 so that the gear box 44 receives the combined driving effect of each of the wind wheels 57.

A semi-circular rack bar 64 extends rearwardly from the frame member 33 in horizontal relation thereto. The rack bar 64 is provided with a plurality of generally rectangular rack teeth 65 on the upper edge thereof as can be seen in Figure 4. A boom 66 is secured to the frame member 33 by a pivot 67 engaged through the forward end of the boom 66 with the boom 66 extending in horizontal relation overlying the semi-circular rack 64. The boom 66 has triangular tail members 68 and 69 extending upwardly and downwardly therefrom in vertically aligned relation.

A pawl bracket 70 is secured to the boom 66 by a clamping band 71 extending thereabout. The pawl brackets 70 include a pair of oppositely extending spaced parallel ears 72 each of which has a pawl 73 positioned therebetween and pivoted on a pivot pin 74. A pair of oppositely extending booms 75 are secured to the pawl bracket 70 and carry pulleys 76 in depending relation on their outer ends. An operating cable 77 is trained over each of the pulleys 76 and has one end thereof secured at 78 to the pawls 73. A coil spring 79 engages about each of the pivots 74 and normally biases the pawls 73 into engagement with the teeth 65 on the rack bar 64.

The outer ends 34, 35 of the frame member 33 are provided with pulleys 80 and a cable 81 is trained over each of the cables 80 and has the rear end thereof secured at 82 to the boom 66.

The cables 77 serve to selectively raise the pawls 73 so that the vanes 68 and 69 can be swung on the pivot 67 by means of the cables 81 to a position at right angles to the frame members 32. The cable 77 and the cables 80 extend to a point adjacent to the ground so that they may be manipulated by an operator standing on the ground. Obviously the wind wheels 57 are held in a position to be rotated by the wind when the vanes 68 and 69 are in the position illustrated in Figure 3 and the wind wheels 57 will be turned to a position transverse to the wind flow when the vanes 68 and 69 are positioned at right angles to the frame members 32. The pawls 73 will lock the vanes 68 and 69 in any desired position on the rack bar 64.

Having thus described the preferred embodiments of the invention, it should be understood that numerous structural modifications and adaptations may be resorted to without departing from the scope of the appended claims.

What is claimed is:

1. A windmill comprising a tower, a circular track secured to the upper end of said tower and arranged horizontally thereon, a second circular track positioned in spaced parallel relation above said first circular track, a horizontal frame positioned between said circular tracks, trunnion wheels interposed between said tracks journalled on said horizontal frame supporting said second name track for rotary movement on said first name track, a horizontally extending framework secured to said second name track, a plurality of wind wheels journaled in said framework, means coupling said wind wheels for joint effort, vanes extending vertically on said framework, and means on said framework for selectively holding said vanes in alignment with said framework and at an angle to said framework.

2. A device as claimed in claim 1 wherein means on said second named track engages beneath said first named track for securing said second named track to said first named track for rotary movement thereon.

3. A device as claimed in claim 1 wherein said tracks are provided with upper and lower V-shaped flanges and said trunnion wheels are provided with V-grooves for engaging over said V-shaped flanges.

References Cited in the file of this patent
UNITED STATES PATENTS

| 190,430 | Halladay | May 8, 1877 |
| 689,635 | Carney | Dec. 24, 1901 |
| 1,752,847 | Hollingsworth | Apr. 1, 1930 |
| 1,780,103 | Wiegand | Oct. 28, 1930 |
| 2,687,267 | Copenhaver | Aug. 24, 1954 |